United States Patent [19]

Kalenian

[11] Patent Number: 5,357,940
[45] Date of Patent: Oct. 25, 1994

[54] AFTERBURNER FOR GRILL

[76] Inventor: Paul A. Kalenian, 104 Meriam Rd., Princeton, Mass. 01541

[21] Appl. No.: 226,104

[22] Filed: Apr. 11, 1994

Related U.S. Application Data

[60] Continuation of Ser. No. 50,688, Apr. 22, 1993, abandoned, which is a division of Ser. No. 820,267, Jan. 14, 1992, Pat. No. 5,226,407.

[51] Int. Cl.$^5$ .............................................. A23C 3/00
[52] U.S. Cl. .................. 126/41 R; 126/293; 126/312
[58] Field of Search .......... 126/25 R, 9 R, 9 A, 126/41 R, 21 A, 20, 293, 312; 110/210, 212, 213, 203; 422/183; 426/523; 99/447

[56] References Cited

U.S. PATENT DOCUMENTS 3,354,848 11/1967 Tolston ........................ 126/25 R
4,700,618 10/1987 Cox, Jr. ........................ 126/25 R
4,907,568 3/1990 Pibernat ........................ 126/25 R Primary Examiner—James C. Yeung
Attorney, Agent, or Firm—Shlesinger Arkwright & Garvey

[57] ABSTRACT

A smokestack addition to a conventional outdoor type of domestic grill is shown that provides a suction at the outlet from the cooking zone of the grill to pull the products of combustion arising from the operation of the grill which suction of the gasses is effective to minimize the circulation of carcinogens in such gasses from flowing over the food being cooked and directs the these effluent gasses over an afterburner associated with the stack that functions to initiate the oxidation of substantially all of the pollutants that flow away from the cooking zone and through the stack to be to be discharged into the atmosphere.

4 Claims, 1 Drawing Sheet

AFTERBURNER FOR GRILL

This application is a continuation of application Ser. No. 08/050,688, filed on Apr. 22, 1993, abandoned, which is a divisional of Ser. No. 07/820,267, filed on Jan. 14, 1992 which is now U.S. Pat. No. 5,226,407.

This invention relates to an improvement in the structure of and operation of an afterburner in a smokestack fitted to a domestic outdoor type of grill structure. This improved grill is constructed to selectively deliver all or most all of the gasses flowing from either above or below the cooking zone into a smoke stack whereby the flow of smoke arising from the combustion of food drippings that fall onto the heated coals can be adjusted to control the degree of contact of the smoke with the food on the grill minimizing the exposure of the food to carcinogens and for controlling the flavor of the food on the grill and then subsequently subjecting all of the combustible and polluting components in the gaseous effluent from the grill to the afterburner to be ignited and consumed in the resulting combustion process within the stack.

PRIOR ART

The use of an afterburner in a smokestack to eliminate combustible components in the gaseous effluent from a combustion process is a known device. Such means are adapted for use with a primary combustion process wherein the further combustion step in the stack or another chamber is adapted to be used to convert any combustible polluting or other noxious substances in the effluent gasses into harmless carbon dioxide and water vapor and other innocuous gaseous substances before release to the atmosphere. Such devices have been shown generally in the prior art in association with commercial furnaces such as commercial incinerators, waste combustion systems and in certain other smoke stack situations as exemplified in the following U.S. patents:

| | |
|---|---|
| 1,925,303 to Church | September 5, 1933 |
| 3,051,100 to Singleton | August 28, 1962 |
| 3,490,466 to Warnock | January 20, 1970 |
| 3,567,399 to Altmann et al | March 2, 1971; and |
| 3,682,599 to Hewitt | August 8, 1972 |

The afterburner shown in Church U.S. Pat. No. 1,925,303 describes the use generally of a gas fired afterburner adapted to be inserted in a conventional stove pipe for the purpose of consuming smoke particles. There is no indication in Church as to just what type of furnace or combustion device his stovepipe afterburner device is to be associated.

Singleton, Altman et al and Hewitt all show afterburner devices associated with trash or waste incinerators. In each of these furnaces all of the effluent gasses and entrained particles flow in a single path directly from the primary combustion chamber into an afterburner enclosure and then directly into the entrance to a chimney.

Warnock discloses an afterburner associated with an ash tray that makes use of a candle in a chimney.

BACKGROUND

This invention provides a particular arrangement for the use of an afterburner in a smoke stack used in combination with a conventional domestic type of outdoor grill wherein a special air and gas flow system is produced around the cooking zone of such a domestic outdoor grill that delivers the effluent gasses selectively from above and/or from below the cooking zone to the afterburner positioned in a smoke stack. This gas flow system is preferably operative to first, substantially eliminate carcinogens which are known to be produced in the normal process of cooking on an outdoor grill from contact with the food being cooked on the grill, which carcinogens result from the reaction of grease dripping from the food being grilled which grease drips onto the fire bricks to be vaporized and ignited to burn which gaseous products normally flow upwardly with the heat flow from the glowing coals along with the products of combustion from the burning propane during this type of cooking process. Secondly, this invention also makes use of the afterburner in a stack means that may be built into or made to be attached to such grills to eliminate certain visible and other combustible pollutants that are usually found in the effluent from the cooking zone.

In the grill shown herein, the afterburner is positioned at the bottom of the smoke stack that is built integral with or added to the conventional form of a domestic outdoor grill in a position to collect all of the gasses flowing from the cooking area, the afterburner being situated directly in the mainstream of all of the combustion gasses flowing away from the cooking process. The height and diameter of the smoke stack are selected to produce a draft that normally removes all of the gaseous effluent flowing from the cooking zone and a damper control means is positioned to cooperate with the stack that causes the bulk of these gases to be removed from the heated cooking zone of the grill from a space below the food placed on its support over the fire bricks and preferably only a controlled and small proportion of the smoke arising from the grease dripping on the fire bricks is allowed to flow over the food on the grill to give the food a smoky flavor. Any of the gasses flowing upwardly from over the food and into the zone above the food is also removed by the draft produced by the stack means.

The afterburner is positioned at the bottom of the stack arrangement and beyond the cooking zone as it is here shown and serves to ignite the burnable, mostly carbon containing solid and combustible gaseous components, such as vaporized grease, carbon monoxide and possibly some minute solid food particles. These materials that normally escape from the heating means and the food being cooked that would otherwise be discharged into the atmosphere and at least some of which would be considered pollutants, are delivered past the afterburner to be ignited to be burned completely to form an invisible and innoxious gaseous discharge.

The afterburner here shown is provided to ignite these combustible materials to burn them in the excess oxygen carried over in the effluent gasses from the cooking process to convert these otherwise pollutants in the effluent into carbon dioxide and other forms of oxides that do not constitute pollutants in the discharge from the smoke stack The stack itself is situated in a position to vent its afterburner effluent above the head of the user of the grill.

One type of such a domestic gas fired outdoor grill has refractory bricks positioned below a food support upon which the food to be cooked is placed. These bricks are heated by a propane gas flame to provide radiant heat energy together with a flow of hot gasses upwardly toward and over the food for completing the cooking process. In such grills, the food being cooked is held spaced a suitable distance above the bricks and the usual melted drippings from the food fall through this space downwardly onto the brick. These drippings are then vaporized and the combustible components thereof are ignited and start to burn upon contacting the heated bricks. The resulting gaseous products normally flow upwardly to wash over the food being cooked and become a part of the usual gaseous effluent from the conventional cooking process as performed on the outdoor cooking grill.

A portion of this vaporized and sometimes burning grease is composed of the fats and oils melted from the usual meat products that are being cooked on such outdoor grills and the portion of the oily drippings that are ignited by the incandescent bricks under the food support not only add heat to the cooking process but in the conventional grill, some of the smoke particles in the burning drippings are deposited on the food on the support. While the absorption of some of the components of this smoke present in the flow of the burning drippings by the meat being cooked is considered to be desirable because they add flavor to the meat, it is now known that some carcinogenic products are entrained in the upwardly flowing vapors of the burning drippings which carcinogenic substances should preferably be eliminated or at least substantially prevented from having any contact with and absorption by the food being cooked.

BRIEF DESCRIPTION OF THIS INVENTION

The outdoor grill here shown has a basic assembly that is the same as that of a conventional propane fired domestic outdoor grill but the grill of this invention is provided with a smoke stack designed to have an adequate height and diameter to produce a positive draft across the cooking zone to draw gasses from the space between the fire bricks and the food on its support as well as from the space over the food, there being means described below to control the flow of the gaseous effluent independently from each one of those spaces in order to control the degree of contact that takes place between the food being cooked and the smoke that arises from the oily drippings falling onto the hot coals. In addition to using the smokestack draft to produce the desired control of the flow of all of the streams of effluent from the cooking zone, the smokestack has an after burner positioned at the bottom portion of the smoke stack that is designed to ignite any combustible constituents in the combined effluent gas flow or the combined gas flows delivered into the stack from the grill, which combined flow contains combustible vaporized greases, carbon monoxide, and small food particles that may be burned and converted into carbon dioxide, water vapor and possibly other innocuous compositions. This ignition of and burning up of the combustible portions of the vaporized drippings, carbon monoxide and smoke particles that are usually entrained in the effluent from the cooking zone, effectively eliminates the greasy deposits that sometimes are deposited on the surrounding objects situated above the grill and any carbon monoxide in the effluent is burned up and also the ignition of the solid particles eliminates the visible smoke particles ordinarily produced when such domestic outdoor grills are used as presently constructed.

IN THE DRAWINGS

DETAILED DESCRIPTION

Figure 1:
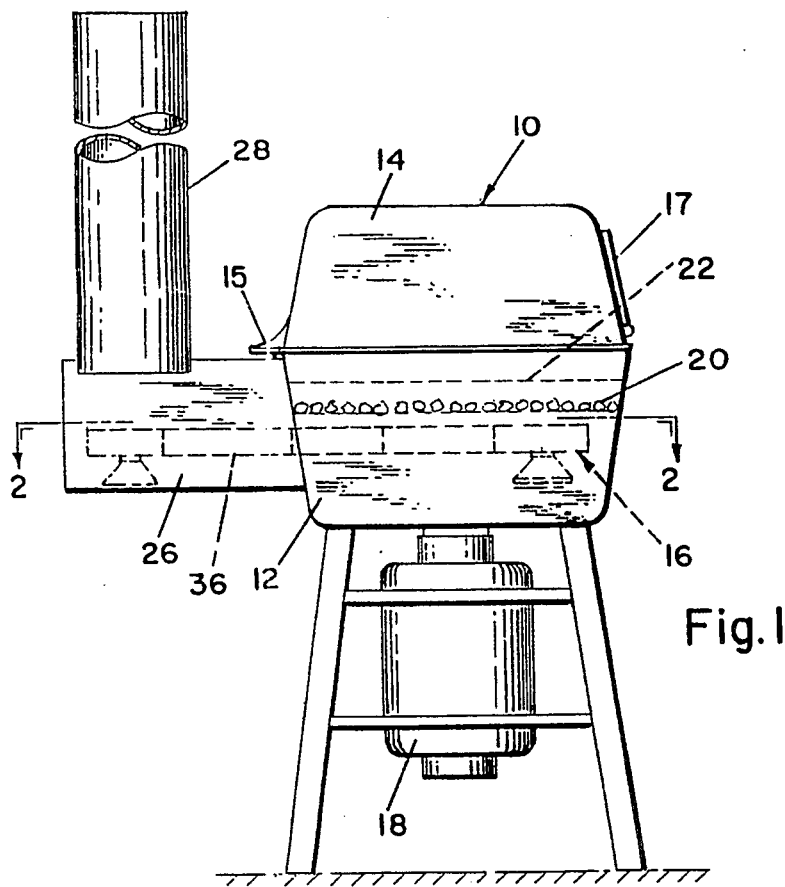
FIG. 1 is a side elevation of a conventional propane fired grill with my smoke stack invention integral therewith.
Figure 2:
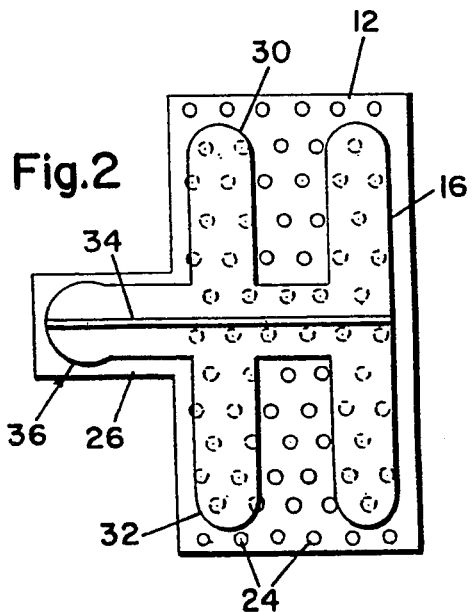
FIG. 2 is a sectional plan view of the grill shown in FIG. 1, taken on the plane 2—2 of FIG. 1.

A gas fired outdoor cooking grill of substantially conventional design is shown in FIG. 1. The grill generally designated as 10 includes a bottom section 12 supported on suitable legs and a top section 14 hinged to the bottom. In one form of such grills, as shown in FIG. 2, the bottom section is designed to enclose an H shaped gas burner generally denoted 16 in FIGS. 1 and 2 that is connected to a propane gas supply through known valve and pressure reducing control means (not shown) to the pressurized gas tank 18. A bed of refractory bricks 20 is supported over the gas burner means and a support means 22 for receiving the food to be cooked is provided, the position of which may be adjusted to any desired spaced relationship with respect to and over the bricks. The top 14 which completes the full enclosure of the cooking zone of the grill is mounted on hinges 15 on the bottom 12 and may be lifted to place the food to be cooked on the support means 22 or a glass door 17 may be hingedly mounted on the front face of the top section 14. Suitable air vents 24 are provided in the under side of the bottom section 12 of the grill, all of which structure is well known.

In some forms of these known propane fired grills, the cooking zone may be divided in half so that only one half of the grill need be fired up if the whole grill's surface is not needed. In this instance a partition means 34 is provided to, divide the space below the food support into halves and conventional controls and gas feeding means (not shown) are built into the grill to make it possible to light up only one half the burner 16, as is indicated in FIG. 2.

In my preferred form of this improved outdoor grill means, at about the center of the rear wall of the bottom section, there is an opening that is adapted to provide a gas flow connection to a conduit means 26 that forms a horizontal passageway that connects the bottom portion of the fully enclosed cooking zone of the grill to the lower end of a vertically disposed smoke stack 28. The horizontal conduit 26 may be cast integrally with the bottom section 12 or may be a separate element that can be attached onto the bottom when the grill is being assembled.

Referring to FIG. 2, a plan view of an H shaped burner is shown and in this form of these grills, as above explained the cooking zone may be divided in half by the wall 34 that separates the cooking space into two sections and thus the burner is also divided into two portions or two halves so that the grill may be used on either one side alone or on both sides of the grill simultaneously if more cooking space is needed. The two separate sections of the burner are indicated as 30 and 32 and the separate sections may be operated individually or both may be ignited simultaneously.

The H shaped burner has a hollow appendage 36 that extends along the length of the horizontal conduit portion 26 and as shown in FIG. 1, the appendage is divided into two corresponding sections by an extension of wall 34. The bottom of this gas burner is spaced somewhat above the floor of the grill and the floor of the horizontal conduit 26 so that some of the fresh incoming air may flow from the inlet openings 24 in the bottom of the grill directly into and along the horizontal conduit 26 to be mixed with the effluent gasses flowing into and through this conduit from the cooking zone to the stack as will be more evident from the description below. This combined air and gaseous effluent flow passes from the horizontal conduit 26 into the stack 28.

The horizontal conduit 26 fully encloses the gas burner appendage 36 that has an enlarged end that constitutes the after burner of this invention. The two halves of the appendage 36 include gas passages which connect the afterburner with the two halves of the burner 16 so that when the propane gas is turned on in the burner 16, the propane gas also flows into either one of or both halves of the appendage 36. The upper surface of each section of the burners 30 and 32 as well as the entire length and enlarged end of this appendage 36 all have a plurality of opening therein, and it is apparent that when either half 30 or 32 is or when both halves of the burner 16 are lighted that the flame will travel along the top surface of the elongated appendage to fire up the enlarged end of the appendage that forms the afterburner that is positioned at the bottom of the stack 28. The appendage supports a continuation of the dividing wall 34 so that only one-half the afterburner is ignited when only one-half the burner 16 is being used.

A suitable igniter (not shown) is provided as is conventional, to light the propane gas when it is turned on for heating the refractory bricks and when the burner is lighted, the associated section or both sections of the afterburner appendage 36 is or are also lighted simultaneously.

Figure 3:
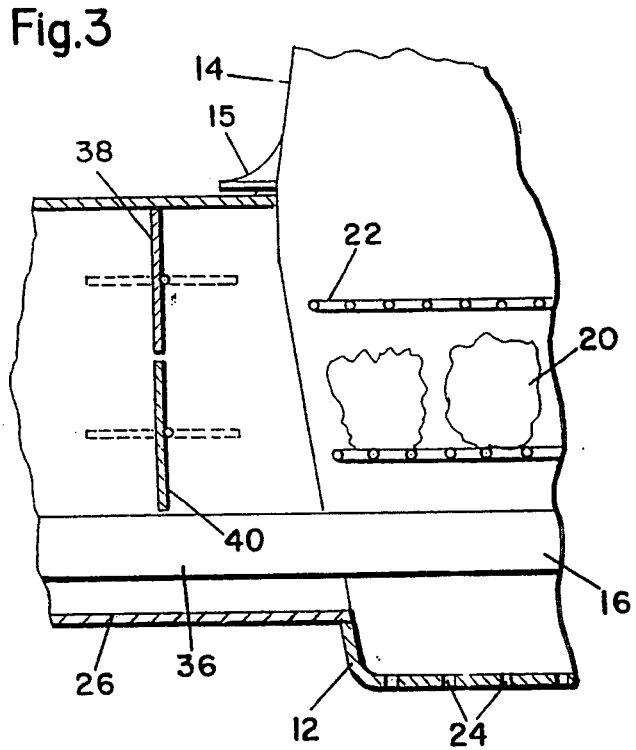
FIG. 3 is a broken away sectional view showing the details of damper means positioned at the entrance the conduit connection between the grill body and the smokestack.

As best seen in FIG. 3 the horizontal conduit 26 is connected to or cast integral with the back side of the grill proper in a manner such that when the grill is in use it accepts a flow of the gaseous effluent from the spaces both above and below the cooking zone of the grill's food support 22. The vertical stack section 28 produces a flow of hot gasses out of the stack and thus a suction draft is established along the horizontal conduit 26 to draw the gasses out of the space from above and from the space immediately below the food that is positioned on the food support 22 and also this suction induces a flow of incoming fresh air from under the gas burner 16 to deliver oxygen into the stack 28. When the grill is in operation it is apparent that all of the effluent gases sucked from below the food support and from above the space above the food are thus forcibly pulled away from the cooking zone and these gasses must pass around the flames along the top of the gas burner appendage 36 to be led into the vertical portion 28 of the smokestack having the afterburner positioned at its lower end. In a normal cooking process the greases melted from the food on the grill which drop onto the heated bricks are vaporized upon contact with the incandescent bricks 22 With the structure here shown all or most all of these vaporized gasses may be sucked through the conduit 26 from the space over the fire bricks and from below the food on its support. These gasses are, when mixed with the air entering through the apertures 24 that is sucked from under the burner means provide a very flammable mixture that is instantly ignited by contact with the afterburner's propane flame at the bottom of the stack 28. Likewise any additional effluent that is drawn from the space over the food being cooked is likewise sucked through the conduit 26 to be passed over the afterburner to be ignited and all of the combustible components therein are completely oxidized as all of these gasses flow upwardly through the stack.

At the entrance to the horizontal conduit 26 a pair of damper means 38 and 40 are situated to adjustably control the volume of the effluent that is sucked from each one of the zones above and below the food in the cooking space in the grill. Damper 38 controls the volume of the effluent flow drawn from over the food being grilled and damper 40 controls the flow of gasses from below the food support 22. These dampers may be individually adjusted as desired to pull all of the gasses away from below the food or allow some of the smoke generated by the burning drippings to flow over the food being cooked on the support 22. It is thus possible to control the flow of smoke produced from the combustion of the dripping grease that is vaporized and set afire upon contacting the hot coals, which smoke it is known contain carcinogens, and by sucking these smoke containing gasses away from under the food, this prevents these carcinogens from coming in contact with the food being cooked. However if some smoke flavor is wanted in the food, these dampers may be set to permit a small portion of that smoke to contact the food to produce a desired flavor in the food. Even though the gasses are pulled away from under the food on its support, it is obvious that the food is cooked by the radiant heat energy flowing from the heated fire bricks.

By proper manipulation of the damper 38 and 40, either substantially all of the effluent gasses may be removed from the cooking zone without letting it contact the food or a selected flavoring component may be permitted to contact the food. The control of the effluent flow in this manner provides a positive control of the volume of smoke that can be allowed to come in contact with the food and thus any carcinogens that are developed in the smoke that flows upwardly from hot bricks 20 can be substantially eliminated From contact with the food being cooked or at least a more tolerable control over the amount of smoke that is known to contain the carcinogens generated in the grilling process can be made.

Thus as the cooking process on the grill is being completed, control of the contact of the food with the harmful carcinogen content in the smoke is exercised, which carcinogens are a reaction product inherently present in the smoke coming from the burning of the drippings of meat products that are being grilled on a conventional domestic outdoor grill. The herein disclosed damper means at the inlet to the horizontal conduit 26 that leads to the afterburner device not only makes substantial control of carcinogens coming in contact with the food possible, but also as the carbon monoxide and other carbon containing compounds and all the other carbon containing compounds such as vaporized grease and minute solid smoke particles that are contained in the effluent gasses, are delivered to the afterburner to be ignited by the afterburner and are burned in the excess air drawn into the smoke stack from under the burners to form carbon dioxide, water and other invisible gaseous compounds that are not considered to be pollutants when exhausted into the atmosphere.

The above is a description of the preferred form of my invention. An obvious simple modification thereof can be made to provide a removable smoke stack attachment device that may be adapted to be attached to and used on an existing domestic type of outdoor grill. The preferred form of the stack described herein, may be constructed to be removable and could easily be attached to an existing grill as taught herein whether it be a propane fired, electrically heated or charcoal heated grill. Thus it is possible that variations of the invention disclosed herein may be made that may fall within the scope of the following claims.

I claim:

1. A method of operating an outdoor grill for cooking meat products and the like over a heat source wherein said grill includes a support for holding the product being cooked in a cooking zone, said support holding the product spaced above said heat source and which cooking process produces a flow of a large volume of effluent gasses away from said cooking zone and during which cooking process fluids drip from the product being cooked onto the heat source so that a portion of the dripping fluids are ignited and certain components of the gaseous products of combustion include carcinogens, comprising energizing the heat source and then adjustably controlling the removal of said effluent gasses and said products of combustion from both above and from below said cooking zone in a manner to permit substantially all of said effluent gasses and said products of combustion to be selectively removed from under the product being cooked while permitting only a portion of the gasses and said products of combustion to contact the product being cooked.

2. A method as in claim 1 wherein a portion of said products of combustion are allowed to contact said food products to give said food a smoky taste.

3. A method as in claim 1 wherein there is a space provided between said support and said heat source and said removal of said effluent gasses and said products of combustion is from said space between said support and said heat source.

4. A method as in claim 3 wherein a portion of said products of combustion are allowed to contact said food products to give said food a smoky taste.

* * * * *